(No Model.)  2 Sheets—Sheet 1.

J. E. SANDERS.
PIPE THREADING MACHINE.

No. 286,333.  Patented Oct. 9, 1883.

WITNESSES:
H. P. Hood.
E. E. Bickler.

INVENTOR:
John E. Sanders (No Model.) 2 Sheets—Sheet 2.
J. E. SANDERS.
PIPE THREADING MACHINE.
No. 286,333. Patented Oct. 9, 1883.
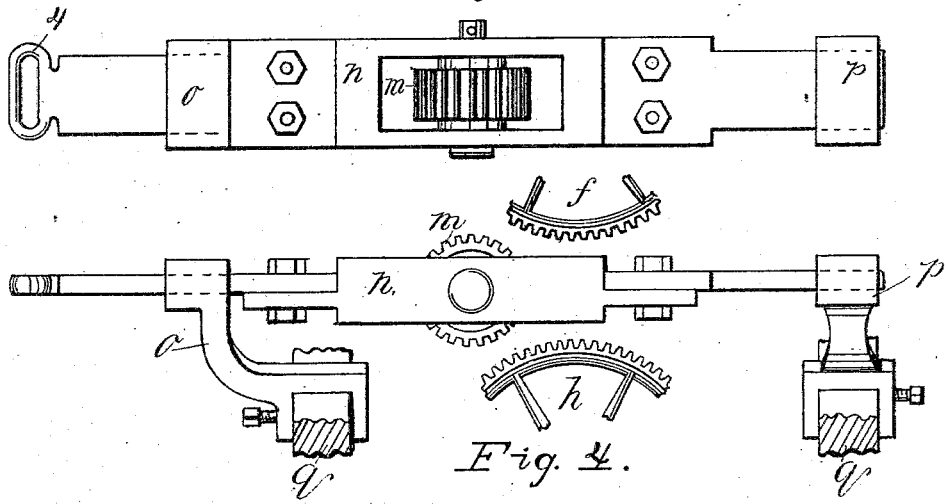
Fig. 5.
Fig. 4.
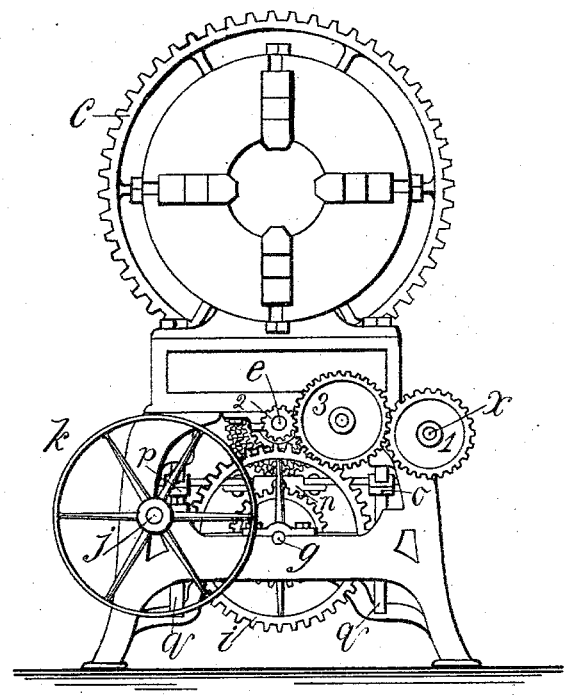
Fig. 2.
WITNESSES:
H. P. Hood.
E. E. Bickler.
INVENTOR:
John E. Sanders

UNITED STATES PATENT OFFICE.

JOHN E. SANDERS, OF INDIANAPOLIS, INDIANA, ASSIGNOR OF ONE-HALF TO ROSWELL R. ROUSE, OF SAME PLACE.

PIPE-THREADING MACHINE.

SPECIFICATION forming part of Letters Patent No. 286,533, dated October 9, 1883.

Application filed June 1, 1883. (No model.)

*To all whom it may concern:*

Be it known that I, JOHN E. SANDERS, a citizen of the United States, residing at Indianapolis, in the county of Marion and State of Indiana, have invented a new and useful Improved Pipe-Threading Machine, of which the following is a specification.

My invention relates to that class of pipe-threading machines in which the pipe is held in a revolving head, and is caused to enter and turn between screw-cutting dies secured in a sliding head.

The objects of my improvement are, first, to provide means for changing the speed of the revolving head, which means shall be permanently a part of the machine, and by which the revolving head may be quickly stopped; second, to provide a positive and exact feed movement for the sliding head carrying the dies.

The accompanying drawings illustrate my invention.

Figure 3:
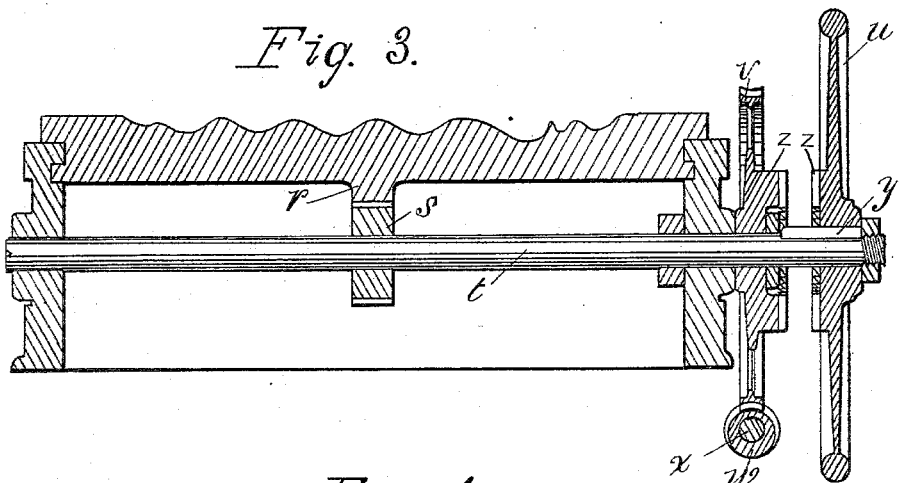
Figure 1:
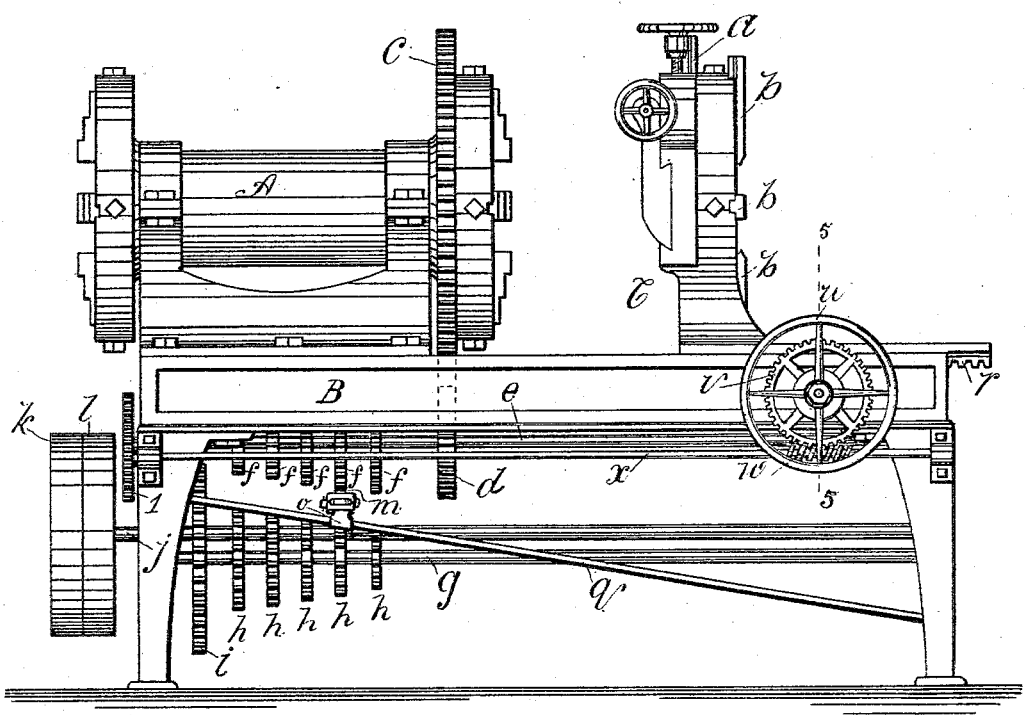

Figure 1 represents a side elevation of my machine; Fig. 2, an end elevation; Fig. 3, an enlarged partial section through 5 5, Fig. 1; Fig. 4, an enlarged elevation of the feed-changing mechanism; Fig. 5, a plan of the same.

Like letters indicate the same parts in all the figures.

A is a hollow spindle, adapted to revolve in bearings permanently secured to the frame B. Said spindle is provided at each end with suitable adjustable jaws for grasping and holding concentrically pipes of different diameters.

C is a sliding head, adapted to slide in suitable ways formed in frame B. Said head is provided with a cutting-off tool, $a$, and screw-cutting dies $b\ b\ b$, of usual and well-known construction. Spindle A is revolved by a cog-wheel, $c$, secured thereon, and driven by a pinion, $d$, on shaft $e$. Shaft $e$ is journaled in suitable bearings on frame B, and carries a series of gears of different diameters, $f\ f\ f\ f\ f$, secured thereto. A shaft, $g$, also journaled in bearings on frame B, carries a series of gears, $h\ h\ h\ h\ h$, of different diameters, placed opposite those on shaft $e$, but in reverse order, and not intermeshing therewith. A large gear, $i$, also secured on shaft $g$, intermeshes with a pinion secured on driving-shaft $j$, on which are also a fast pulley, $k$, and loose pulley $l$. Gears $f$ and $h$ are connected by an intermediate gear, $m$, which is journaled in a sliding bearing, $n$. Said bearing $n$ slides crosswise of the machine in brackets $o$ and $p$. Said brackets are adjustable along an inclined way, $q$, which is secured at each end to the legs of the main frame, and is inclined to correspond with the space between the two series of gears on shafts $e$ and $g$, so that the intermediate gear, $m$, may intermesh with any one of gears $h$, and also with its opposite gear $f$. Sliding head C is provided on its under side with a rack, $r$, and is moved toward or from the spindle A by means of a pinion, $s$, Fig. 3, secured on a shaft, $t$, journaled in bearings in frame B, and revolved by means of a hand-wheel, $u$.

In this class of machines as heretofore constructed the sliding head carrying the screw-cutting dies has been made as thus far described, and in practice the dies have been moved forward by the operator turning the hand-wheel until the thread has been started on the pipe, when the farther forward movement of the dies has been effected by the revolutions of the pipe drawing the sliding head forward by the thread acting on the dies as it is formed. This results in a large amount of friction and waste of power, and frequently spoils the thread. For the purpose of producing a regular and positive forward movement of sliding head C corresponding with the pitch of the screw to be cut, I place on shaft $t$ a screw-gear, $v$, which is turned by a screw-pinion, $w$, on shaft $x$. Gear $v$ turns loosely on shaft $t$, and hand-wheel $u$ slides on the shaft, but is kept from turning thereon by a key, $y$. Shaft $t$ is turned with screw-gear $v$ by means of a clutch, $z\ z$, formed on the opposing sides of the gear and the hand-wheel, and engaging only when said hand-wheel is slid against the gear. Shaft $x$ is journaled in bearings on frame B, and is revolved by means of gear 1, secured thereon, a pinion, 2, secured on shaft $e$, and an intermediate gear, 3. It will be seen that sliding head C is, by the above-described means, moved forward over the pipe at a regular speed, which bears a fixed relation to the revolutions of spindle A, carrying the pipe to be threaded.

In this class of machines it is necessary that large pipe should be revolved at a much less speed than small pipe. As heretofore constructed, the desired change of speed in the pipe-holding spindle has been attained by a series of separate gears of different diameters, two of which, having been selected, are secured, respectively, to the driving-shaft and the shaft immediately connected with the spindle. In my machine the two series of gears $f$ and $h$ are permanently secured to their shafts in the machine, the larger ones in one series being opposite the smaller ones in the other, and the variation in speed in the spindle is secured by connecting any desired two opposite gears by means of the sliding intermediate gear, $m$, as follows: The sliding bearing $n$, in which gear $m$ is journaled, is drawn outward, sliding in brackets $o$ and $p$, by means of handle 4 until gear $m$ is out of the path of the gears $f$ and $h$. Brackets $o$ and $p$ are then slipped along inclined ways $q$ until gear $m$ is opposite the pair of gears which it is desired to connect to give the required speed to spindle A. The brackets are then secured in position by set-screws. Sliding bearing $n$ is now pushed inward till gear $m$ intermeshes with the gears it is desired to connect. It is evident that by simply drawing gear $m$ outward the revolutions of the pipe and the movement of the cutting-dies may be instantly stopped.

All of the parts necessary to the changing of the speed and the proper operation of the machine are permanently organized therein, and a regular and positive feed motion is given to the dies, which motion is proportionately the same at all speeds of the pipe-holding spindle.

I claim as my invention—

1. In a pipe-threading machine, the combination, with a hollow spindle adapted to revolve and to receive and grasp a pipe, and a a frame supporting the same, of the two series of gears of different diameters, arranged, substantially as shown and described, on shafts mounted in said frame, means for transmitting motion from one of said shafts to said spindle, and an intermediate gear mounted in a sliding bearing and adapted to engage opposite gears in said series, substantially as and for the purpose specified.

2. In a pipe-threading machine, the combination, with a hollow spindle adapted to revolve and to receive and grasp a pipe, a frame supporting the same, a driving-shaft mounted on said frame, means for revolving said shaft at different speeds, and means for transmitting motion from said shaft to said spindle, of a sliding head adapted to slide in said frame, and provided with screw-cutting dies, a rack on said sliding head, a pinion engaging said rack, a shaft mounted transversely in said frame and carrying said pinion, and mechanism connecting said transverse shaft with the first-mentioned driving-shaft, whereby the said sliding head is moved toward the said spindle at a regular fixed rate at each revolution of the spindle, substantially as and for the purpose specified.

3. The combination of two series of gears of different diameters, mounted opposite each other, in reverse order, on suitable shafts, substantially as shown and described, an inclined way, a pair of brackets fitted to and adjustable along said way, a bearing adapted to slide in said brackets, and a gear journaled in said bearing and adapted to engage and connect the gears of the two series above mentioned, all combined substantially in the manner and for the purpose specified.

4. The combination, in a pipe-threading machine, with a sliding head, C, frame B, rack $r$, pinion $s$, and shaft $t$, of screw-gear $v$, adapted to turn loosely on said shaft $t$, screw-pinion $w$, shaft $x$, and means for engaging gear $v$ with shaft $t$ at will, substantially as and for the purpose set forth.

JOHN E. SANDERS.

Witnesses:
H. P. HOOD,
E. E. SICKLER.